United States Patent [19]

Bakal et al.

[11] Patent Number: 4,990,354

[45] Date of Patent: Feb. 5, 1991

[54] COMPOSITION FOR ENHANCING THE SWEETNESS INTENSITY AND MASKING THE AFTERTASTE OF INTENSE AND ARTIFICIAL SWEETENERS

[75] Inventors: Abraham I. Bakal, Parsippany, N.J.; Marvin E. Eisenstadt, Neponsit, N.Y.

[73] Assignee: Cumberland Packing Corp., Brookyn, N.Y.

[21] Appl. No.: 548,665

[22] Filed: Jul. 5, 1990

[51] Int. Cl.$^5$ .............................................. A23L 1/236
[52] U.S. Cl. ..................................................... 426/548
[58] Field of Search ......................................... 426/548

[56] References Cited

U.S. PATENT DOCUMENTS 3,296,079 1/1967 Griffin .............................. 426/548 X
3,625,711 12/1971 Eisenstadt ............................ 426/548
3,934,047 1/1976 Schade ................................. 426/548

Primary Examiner—Joseph Golian
Attorney, Agent, or Firm—Steinberg & Raskin

[57] ABSTRACT

Natural extracted honey flavor and/or coconut flavor in small amounts are used to enhance the sweetness of intense and artificial sweeteners while simultaneously reducing objectionable aftertaste thereof. These natural flavors, which can also be mixed with other fruit flavors, in amounts below the level at which the flavor itself is recognizable, have been found to increase the intensity level of artificial sweeteners and reduce undesired aftertaste thereof.

26 Claims, No Drawings

COMPOSITION FOR ENHANCING THE SWEETNESS INTENSITY AND MASKING THE AFTERTASTE OF INTENSE AND ARTIFICIAL SWEETENERS

BACKGROUND OF THE INVENTION

The need for low calorie or no calorie sweeteners for persons for want to restrict their caloric intake and for diabetics is well established. These low calorie or no calorie sweeteners are used for weight control in cases of obesity, or for medical reasons, and for restriction of the intake of carbohydrates for diabetics in order to reduce their intake of sucrose, glucose, etc.

Artificial sweeteners or intense sweeteners, which have a sweetening intensity many times that of sucrose, such as saccharin and its salts, aspartame (chemically aspartyl phenyl alanine methyl ester), acesulfame-K (chemically acesulfame potassium), cyclamates, extracts of the plant stevia rebaudiana, known as stevioside, extracts of the African berry *Thaumatococcus Danieli*, known as Thaumatin, sucralose, alitame, and the like, are all characterized as not only intense in sweetening but also as providing an undesired aftertaste, which distinguish the same from the taste of sucrose. For example, saccharin has been characterized as having a bitter aftertaste. Aspartame is known to have a sweetness lag and a cloying sweet aftertaste. Cyclamates have been reported to have a metallic aftertaste. Acesulfame-K is known to have a slight metallic aftertaste.

Many compositions have been provided and efforts made to overcome the problem of the undesired aftertaste. For example, Patent No. 3,625,711, teaches the addition of potassium bitartrate and a small amount of a sugar, such as dextrose, to saccharin for the reduction of the aftertaste thereof. Patent No. 3,695,898, teaches the addition of small amounts of aspartame to mask the bitter aftertaste of saccharin. Canadian Patent No. 1,043,158, describes the use of a combination of aspartame, saccharin and cyclamate to reduce the lingering or bitter aftertaste associated with these sweeteners when used singly.

An additional problem with the intense or artificial sweeteners is that many of these sweeteners, such as aspartame, acesulfame-K, sucralose and alitame, are significantly more expensive than saccharin or cyclamates. Accordingly, although these substances are very sweet, there is a considerable incentive to enhance their sweetness intensity and thus reduce the amount thereof required for sweetening purposes.

SUMMARY OF THE INVENTION

In accordance with the present invention, it has been found that the addition of small amounts of natural honey flavors and/or coconut flavors, with or without other fruit flavors, has the effect of enhancing the sweetness of intense and artificial sweeteners, such as saccharin, acesulfame-K and aspartame, while at the same time reducing the objectionable aftertaste thereof.

It is thus a primary object of the present invention to provide compositions for masking the aftertaste of intense sweeteners while simultaneously enhancing the sweetness thereof.

It is still a further object of the present invention to provide compositions and methods for masking the bitter aftertaste of sweetener compositions which contain the presently approved artificial sweeteners, saccharin, acesulfame-K and aspartame.

Other objects and advantages of the present invention will be apparent from a further reading of the specification and of the appended claims.

With the above and other objects in view, the present invention mainly comprises a composition of an intense or artificial sweetener and a small amount of honey flavor and/or coconut flavor, with or without the addition of other fruit flavors, to mask undesired aftertaste of the sweetener while simultaneously enhancing the sweetness intensity thereof.

While this invention is applicable to any of the known intense and artificial sweeteners, including saccharin, aspartame, acesulfame-K, cyclamates, steviosides, thaumatin, sucralose and alitame, the artificial sweeteners presently approved by the FDA are saccharin, aspartame and acesulfame-K and the present invention is particularly applicable thereto.

The honey flavor used for the purposes of the present invention is natural liquid honey flavor derived by extraction and distillation of honey. For use in connection with dry compositions, this liquid natural honey is dried on a carrier using conventional drying methods such as spray drying.

Natural coconut flavor is obtained in a similar manner and can be used with or without the natural honey flavor. Particularly good results are obtained by a combination of coconut and honey flavors.

Suitable carriers for the honey flavor and/or coconut flavor include maltodextrin, corn syrup solids, gum arabic, protein and other drying carriers, commonly used by those familiar with the art. The ratio of the natural flavor (honey and/or coconut) to the carrier, is generally in the range of about 1:99 to 10:99, in parts by weight.

The amount of natural flavor (honey coconut) needed to reduce the aftertaste of the artificial sweetener and increase the sweetness intensity thereof is very small. Amounts of the natural flavor as low as 0.001% of the amount of artificial sweetener have been found to be effective. In general, the amount of the flavor should not exceed about 0.2% by weight of the intense sweetener. The preferred amount of the natural flavor (honey and/or coconut) as compared to the amount of intense or artificial sweetener is 0.05–0.1%.

Thus, in selecting the actual amount of the natural flavor, the amount should be sufficient to enhance the sweetness of the intense sweetener but should be below the threshold amount at which the flavor (honey or coconut) becomes recognizable to the taste.

DESCRIPTION OF PREFERRED EMBODIMENTS

The following examples are given to further illustrate the present invention. The scope of the invention is not, however, meant to be limited to the specific details thereof.

EXAMPLE 1

Liquid natural honey flavor is derived through extraction and distillation of honey. The liquid natural honey flavor is mixed with encapsulating starch (National Starch's Capsul), maltodextrin and water. The amounts used were 5 parts of the liquid flavor, 10 parts of the encapsulating starch, 85 parts of maltodextrin and 100 parts of water. All parts are by weight. The mixture was spray dried to yield a dry powder. This powder was used in the tabletop sweetener formulations described in the further examples.

EXAMPLE 2

A mixture of 95% coconut flavor and 5% honey flavor was prepared. This mixture was dried on a carrier as described in Example 1 and the resulting powder was used in tabletop compositions as described in the further examples.

EXAMPLE 3

A composition was prepared as in Example 1, using as natural flavor 99.5% of liquid coconut flavor and 0.5% of natural eugenol.

EXAMPLE 4

Four tabletop compositions were prepared in accordance with the following formulations:

|  | PERCENT | | | |
| --- | --- | --- | --- | --- |
|  | Control | A | B | C |
| Sodium or calcium saccharin | 3.6 | 3.6 | 3.6 | 3.6 |
| Flavor (Example 1) | — | 0.3 | — | — |
| Flavor (Example 2) | — | — | 0.3 | — |
| Flavor (Example 3) | — | — | — | 0.2 |
| Dextrose | 96.4 | 96.1 | 96.1 | 96.2 |

One gram of each of the above mixtures was used to sweeten 8 ounces of coffee. The coffee was evaluated by expert judges for sweetness intensity and aftertaste. The judges found control samples as having a significant aftertaste. Samples A, B and C were judged as having no aftertaste and as sweeter than the control.

It should be noted that the natural flavor composition added was dried with maltodextrin and starch as carriers. During drying, some of the volatile components of the flavor are lost. However, the total flavor added to the dry tabletop compositions is 0.015% in preparations A and B and 0.01% in preparation C. The concentration of the honey flavor in the coffee sweetened with composition A is less than 1 ppm. Thus, it is clear that the presence of the flavor is below its threshold recognition level.

EXAMPLE 5

The compositions of Example 4 were evaluated using tea as the beverage in the same manner as in Example 4. Similar results were obtained.

EXAMPLE 6

Four tabletop compositions containing aspartame as the sweetener were prepared in accordance with the following formulations:

|  | PERCENT | | | |
| --- | --- | --- | --- | --- |
|  | Control | A | B | C |
| Aspartame | 3.8 | 3.8 | 3.8 | 3.8 |
| Flavor (Example 1) | — | 0.3 | — | — |
| Flavor (Example 2) | — | — | 0.3 | — |
| Flavor (Example 3) | — | — | — | 0.2 |
| Dextrose | 96.2 | 95.9 | 95.9 | 96.0 |

These compositions were evaluated by adding 1 gram to 8 ounces of coffee or tea.

The panel judged the control product as sweet with lingering sweet aftertaste. The addition of the flavor composition resulted in enhancement of the initial sweetness impact and reduction in the lingering aftertaste.

The compositions were evaluated by adding 1 gram to 8 ounces of coffee (Test A), or to 8 ounces of tea (Test B). Panel evaluation was carried out in the same manner as Example 4. The panel judged the control product as sweet with lingering sweet after taste. The addition of the flavor compositions resulted in an acceleration of the initial sweetness impact and the reduction of the lingering aftertaste in both Tests A and B.

EXAMPLE 7

The following compositions were evaluated using a large scale consumer panel:
1. Sugar—added to coffee (8 grams to 6 oz. of freshly brewed coffee).
2. Control—One sachet containing 36mg of sodium saccharin, 959mg of dextrose and 5mg of calcium silicate (an anticaking agent), was added to 6 oz. of freshly brewed coffee.
3. Experimental—One sachet containing 36mg of sodium saccharin, 956mg of dextrose, 3mg of the flavor described in Example 2 and 5mg of calcium silicate (an anticaking agent) was added to 6 oz. of freshly brewed coffee.

Forty respondents who normally drink their coffee sweetened with sugar were asked to evaluate each of the coffees mentioned above for sweetness intensity and level of aftertaste on a scale of 0 to 10. Each coffee was rated independently using a sequential monadic testing procedure. In order to eliminate bias due to order of tasting, the sequence of sample presentation was randomized.

The results are summarized below:

|  | Sweetness Intensity | Level Of Aftertaste |
| --- | --- | --- |
| Sugar | 5.7 | 1.8 |
| Control | 6.5 | 4.5 |
| Experimental | 7.1 | 2.1 |

Statistical analysis of the data indicates that respondents judged both saccharin-sweetened coffees as sweeter than sugar and the coffee sweetened with the experimental composition as sweeter than the control. The control had a significant whereas the experimental did not.

Since all respondents were also sugar users, they were asked to indicate how close the sweetened coffees were to the one they normally consume. The scale was as follows:
0=Much worse
5=About the same
10=Much better The coffee sweetened with sugar received a score of 4.7, the experimental product 4.2, and the control 2.5.

EXAMPLE 8

Further tests were carried out to evaluate the effect of the honey and/or coconut flavors on artificial sweeteners when used in the flavoring of carbonated beverages.

Liquid natural coconut, and honey flavors (75% coconut, 25% honey) were added to the following carbonated beverages:
Cola flavor sweetened with calcium saccharin at a concentration of 10.5mg saccharin per fluid ounce.

Cola flavor sweetened with aspartame at a concentration of 14mg per fluid ounce.

The liquid flavor was added to the beverages to yield 0.5, 1, 2, 5, 10, and 25 ppm.

The results indicate that the beverages containing up to 10 ppm of flavor (below the threshold recognition level), were judged as sweeter and having less aftertaste than the control beverages. At the 25 ppm level, (above the threshold recognition level), the honey flavor was recognizable and detracted significantly from the acceptance of the beverage.

EXAMPLE 9

A sweetener mix was prepared using the following formulation:

| | |
|---|---|
| Acesulfame-K | 4.8 parts |
| Maltodextrin | 94.9 parts |
| Liquid and honey and coconut Flavors (Example 2) | 0.3 parts |
| Water | 100 parts |

This mixture was spray dried to yield a tabletop sweetener having a bulk density of approximately 0.-Ig/cc. Products of this type are used in the same manner as sugar, namely a teaspoon of this product is used in the same way as a teaspoon as sugar.

The above sweetener was evaluated, using an expert taste panel as in the previous examples, in hot coffee, hot tea and iced tea against the same sweetener, however, without the addition of the honey and coconut flavors. The panel judged the sweetener with the flavors having significantly less aftertaste and being significantly sweeter than the comparison composition without the liquid honey and coconut flavors.

As the result of the above tests it is clear that the natural honey and/or coconut flavors when used with artificial sweeteners in an amount below the threshold level of recognition of the taste of the honey and/or coconut, has the effect of enhancing the sweetness of the artificial sweetener while reducing undesired aftertaste thereof. In beverages, amounts as little as 0.1 ppm of the finished beverage is effective for the purposes of the invention. In general, amounts greater that 10 ppm are undesired.

The combination of honey flavor and flavor is particularly effective and the ratio of flavors can be between 99:-I and 1:99. These combinations are effective in the same concentrations as either the honey flavor or the coconut alone.

The addition of about 0.05 parts to one part of eugenol to either of the flavors reduces the required use level. The amount of eugenol should also be below the threshold recognition level thereof.

When used on carriers such as maltodextrin, corn syrups carriers, gum arabic, protein and other drying carriers, the ratio of flavor to carrier is generally in the range of 1:99 to 10:99 parts by weight.

In tabletop sweetener compositions, the dry product of the invention is preferably used in an amount of 0.15% to 5%, the level depending on the amount of carrier used to dry the product and the level of intense sweetener used in the tabletop composition. The ratio of the intense sweetener to the flavor system, excluding its drying aid component, should be in the range of 1000:1 to 50:1, preferably in the range of 500:1 to 100:1. The ranges are in parts by weight.

While the invention has been described with respect to particular compositions, it is apparent that variations and modifications of the invention can be made without departing from the spirit or scope thereof.

What is claimed is:

1. Intense sweetener composition, said composition comprising an intense or artificial sweetener having an undesired aftertaste, and at least one of natural honey flavor or natural coconut flavor in an amount below the threshold recognition level of the taste of said natural flavor, while being sufficient to intensify the sweetness of said intense or artificial sweetener and reduce the undesired aftertaste thereof.

2. Composition according to claim 1 wherein said sweetener is saccharin, aspartame or acesulfame-K.

3. Composition according to claim -1 wherein said natural flavor is dried on a carrier.

4. Composition according to claim 2 wherein said natural flavor is dried on a carrier.

5. Composition according to claim 3 wherein said carrier is maltodextrin, corn syrup solids, gum arabic or a protein carrier.

6. Composition according to claim 3 wherein the ratio of natural flavor to carrier is between 1:99 and -10:99 in parts by weight.

7. Composition according to claim 1 wherein the amount of said natural flavor is at least 0.001% of the amount of said intense or artificial sweetener.

8. Composition according to claim 2 wherein the amount of said natural flavor is at least 0.001% of the amount of said artificial sweetener.

9. Composition according to claim the amount of natural flavor is between 0.001-0.2% by weight of the intense or artificial sweetener.

10. Composition according to claim 2 wherein the amount of natural flavor is between 0.001-0.2% by weight of said artificial sweetener.

11. Composition according to claim 1 wherein the amount of natural flavor is between 0.05-0.1% by weight of the intense or artificial sweetener.

12. Composition according to claim 2 wherein the amount of natural flavor is between 0.05-0.1% by weight of said artificial sweetener.

13. Composition according to claim 1 wherein a mixture of natural honey flavor and natural coconut flavor is present.

14. Composition according to claim 2 wherein a mixture of natural honey flavor and natural coconut flavor is present.

15. Composition according to claim 1 and also containing eugenol in an amount below the threshold recognition level of the taste of said eugenol.

16. Composition according to claim 2 and also containing eugenol in an amount below the threshold recognition level of the taste of said eugenol.

17. Composition according to claim 15 wherein the amount of eugenol is 0.05 parts per each part of said natural flavor.

18. Composition according to claim 16 wherein the amount of eugenol is 0.05 parts per each part of said natural flavor.

19. Beverage sweetened with an in or artificial sweetener and at least one of natural honey flavor or natural coconut flavor in an amount below the threshold recognition level of the taste of said natural flavor while being sufficient to intensify the sweetness of said intense or artificial sweetener and reduce undesired aftertaste thereof.

20. Beverage according to claim 19 wherein said sweetener is saccharin, acesulfame-K or aspartame.

21. Beverage according to claim 19 wherein the amount of said natural sweetener is at least 0.01 ppm of said beverage.

22. Beverage according to claim 20 wherein the amount of said natural sweetener is at least 0.01 ppm of said beverage.

23. Beverage according to claim 19 wherein the amount of said natural flavor is between 0.0-i ppm to lo ppm.

24. Beverage according to claim 20 wherein the amount of said natural flavor is between 0.01 ppm to 10 ppm.

25. Composition according to claim 13 wherein the ratio of honey flavor to coconut flavor is between about 99:1 and 1:99.

26. Composition according to claim 14 wherein the ration of honey flavor to coconut flavor is between about 99:1 and 1:99.

* * * * *